United States Patent
Knittel et al.

(10) Patent No.: US 8,213,289 B2
(45) Date of Patent: Jul. 3, 2012

(54) COMPATIBLE OPTICAL RECORDING MEDIUM

(75) Inventors: Joachim Knittel, Tuttlingen (DE); Hartmut Richter, Villingen-Schwenningen (DE); Alan Bruce Hamersley, Newbury Park, CA (US)

(73) Assignee: Thomson Licensing, Issy les Moulineaux (FR)

( * ) Notice: Subject to any disclaimer, the term of this patent is extended or adjusted under 35 U.S.C. 154(b) by 297 days.

(21) Appl. No.: 12/311,671

(22) PCT Filed: Sep. 24, 2007

(86) PCT No.: PCT/EP2007/060106
§ 371 (c)(1), (2), (4) Date: Apr. 8, 2009

(87) PCT Pub. No.: WO2008/043661
PCT Pub. Date: Apr. 17, 2008

(65) Prior Publication Data
US 2010/0002559 A1   Jan. 7, 2010

(30) Foreign Application Priority Data

Oct. 10, 2006 (EP) .................................... 06122015
Dec. 14, 2006 (EP) .................................... 06301252

(51) Int. Cl.
*G11B 7/00* (2006.01)
(52) U.S. Cl. ........................................................ 369/121
(58) Field of Classification Search .................. None
See application file for complete search history.

(56) References Cited

U.S. PATENT DOCUMENTS

| | | | | |
|---|---|---|---|---|
| 4,466,087 A * | 8/1984 | Cheng | ......................... | 369/44.13 |
| 4,546,463 A * | 10/1985 | Opheij et al. | ............. | 369/112.17 |
| 4,771,415 A * | 9/1988 | Taki | ......................... | 369/112.27 |
| 4,935,913 A * | 6/1990 | Shinoda | ..................... | 369/47.21 |
| 5,007,039 A * | 4/1991 | Sakemoto et al. | ............ | 369/116 |
| 5,373,492 A * | 12/1994 | Miyamoto et al. | ........ | 369/112.28 |
| 5,442,597 A * | 8/1995 | Spruit et al. | ............... | 369/13.02 |
| 5,659,534 A | 8/1997 | Terasaki et al. | | |

(Continued)

FOREIGN PATENT DOCUMENTS

JP          10021550 A       1/1998

(Continued)

OTHER PUBLICATIONS

Search Report Dated Oct. 22, 2007.

(Continued)

*Primary Examiner* — Peter Vincent Agustin
(74) *Attorney, Agent, or Firm* — Robert D. Shedd; Jeffrey M. Navon

(57) ABSTRACT

The optical recording medium has a recording layer sensitive for recording at a first wavelength and sensitive for reading at a second wavelength, the recording layer having a groove structure, wherein at the first wavelength the groove structure has a diffraction efficiency into a first diffraction order sufficiently large to generate a push-pull signal, and at the second wavelength it has a diffraction efficiency into a first diffraction order close to zero. The optical pickup for recording on an optical recording medium intended to be read with a second wavelength and a second numerical aperture is characterized in that it has a light source for generating a light beam at a first wavelength and a numerical aperture given by the second numerical aperture multiplied with a ration of the first wavelength and the second wavelength.

5 Claims, 2 Drawing Sheets

U.S. PATENT DOCUMENTS

Figure 1:
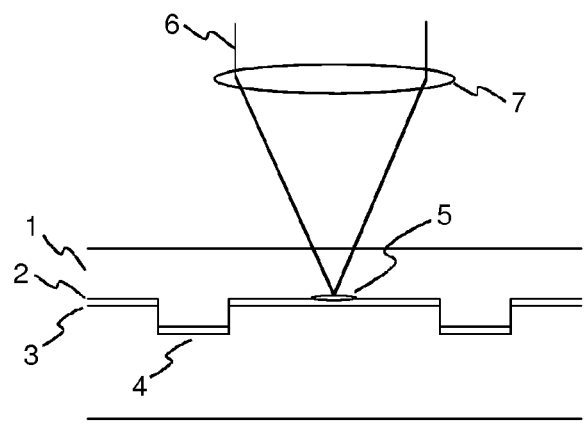

| | | | |
|---|---|---|---|
| 5,680,386 A | 10/1997 | Le Carvennec et al. | |
| 6,243,326 B1 * | 6/2001 | Sumi et al. | 369/13.29 |
| 6,373,809 B1 * | 4/2002 | Rauch et al. | 369/121 |
| 6,545,971 B1 * | 4/2003 | Tsukamoto et al. | 369/116 |
| 6,590,857 B2 | 7/2003 | Ohkubo | |
| 6,661,770 B2 * | 12/2003 | Kakuta et al. | 369/275.4 |
| 2002/0167887 A1 * | 11/2002 | Moscovitch | 369/121 |
| 2005/0254410 A1 * | 11/2005 | Kibe et al. | 369/275.1 |

FOREIGN PATENT DOCUMENTS

| | | |
|---|---|---|
| JP | 2001056958 A | 2/2001 |
| JP | 2002150614 A | 5/2002 |
| WO | 2005017886 A2 | 2/2005 |

OTHER PUBLICATIONS

European Search Report dated Aug. 20, 2007.

* cited by examiner

COMPATIBLE OPTICAL RECORDING MEDIUM

This application claims the benefit, under 35 U.S.C. §365 of International Application PCT/EP2007/060106, filed Sep. 24, 2007, which was published in accordance with PCT Article 21(2) on Apr. 17, 2008 in English and which claims the benefit of European patent application No. 06122015.8, filed Oct. 10, 2006 and European patent application No. 06301252.0, filed Dec. 14, 2006.

The present invention relates to a format of a recordable optical recording medium, which is designed in such a way that it can be read by any standard player and recorder, and to an optical pickup unit suitable for writing data onto the recordable optical recording medium.

The distribution of digital data such as movies or software on optical recording media today is established as the main distribution channel. However, this means that stores need to stock a large amount of titles in order to be able to provide most requested titles immediately to their customers without having to order them.

In order to reduce this need for a large stock several solutions for a manufacturing on demand or a distribution via networks have been proposed. The optical recording medium, typically a DVD (digital versatile disk), is recorded as soon as a title is requested by a customer. Recording is done with a special recorder provided in a store, with a kiosk type recording terminal, or by a special consumer recorder connected to a network. These special recorders allow to write data to a recordable DVD in such a way that the DVD has the appearance of a CSS-encrypted DVD-Video (ROM) disk, even though it is a specially finalized recordable DVD. For recording the optical recording medium has a groove structure to guide an optical pickup unit relative to the optical recording medium.

In order to establish the above described solutions as further distribution channels, the recorded optical recording media have to be compatible with as many standard players and recorders as possible. While this is usually not a problem for players, the situation is different with recorders. As a copy protection mechanism some optical pickups used in recorders do not allow to retrieve data from an optical recording medium indicated as a read-only medium when a push-pull signal originating from the groove structure is found, which is an indication of a recordable optical recording medium. Such incompatibilities have to be avoided.

It is an object of the invention to propose a format for a recordable optical recording medium, which has the appearance of a read-only optical recording medium for most players and recorders.

According to the invention, this object is achieved by an optical recording medium with a recording layer sensitive for recording at a first wavelength and sensitive for reading at a second wavelength, the recording layer having a groove structure, wherein at the first wavelength the groove structure has a diffraction efficiency into a first diffraction order sufficiently large to generate a push-pull signal, and at the second wavelength it has a diffraction efficiency into a first diffraction order close to zero.

The invention proposes a format of an optical recording medium, which is recorded with a laser system of a first wavelength, e.g. 405 nm, and intended to be written at a second wavelength, e.g. 650 nm. The material of the recording layer of the optical recording medium is sensitive to the first wavelength for recording. It is at the same time chosen such that the recorded data can be read by the second wavelength. The optical recording medium is designed in such a way that it can be read by any standard player or recorder. For this purpose the push-pull signal generated by the optical recording medium has the following properties:

At the first wavelength the push-pull signal is strong, as it is necessary for tracking.

At the second wavelength the push-pull signal is nearly zero to avoid incompatibilities with recorder pickups. Tracking is done with DPD (differential phase detection) or another tracking method that does not require a groove structure. The difference between the first wavelength and the second wavelength preferably is at least 50 nm in order to enable the transition from a large diffraction efficiency at the first wavelength to the nearly zero diffraction efficiency at the second wavelength. The format according to the invention has the advantage that the recorded media are similar to read-only media and compatible with most players and recorders.

When a wavelength of 405 nm is used for recording and a wavelength of 650 nm is used for reading, the groove structure preferably has a groove width of less then 120 nm and a groove depth of around 40 nm. At 405 nm such a groove structure has a diffraction efficiency into a first diffraction order sufficiently large to generate a push-pull signal, whereas at 650 nm the diffraction efficiency into the first diffraction order is close to zero Advantageously, an optical pickup for a recording device for recording on an optical recording medium intended to be read with a second wavelength and a second numerical aperture, with a light source for generating a light beam at a first wavelength, has a numerical aperture given by the second numerical aperture multiplied with the ratio of the first wavelength and the second wavelength.

In this way the laser spot size on the optical recording medium has essentially the same size as the laser spot of a pickup for reading the optical recording medium at the second wavelength with the second numerical aperture. For example, with a recording wavelength of 405 nm, a reading wavelength of 650 nm and a reading numerical aperture of 0.6 the recording numerical aperture is given by 0.6×405 nm/605 nm=0.374. Due to the low NA the optical pickup can be manufactured very easily, as a small NA allows for large mechanical tolerances of the optics. Alternatively, the laser spot size is adapted by decreasing the beam quality factor $M^2$ or by operating out of focus.

Figure 2:
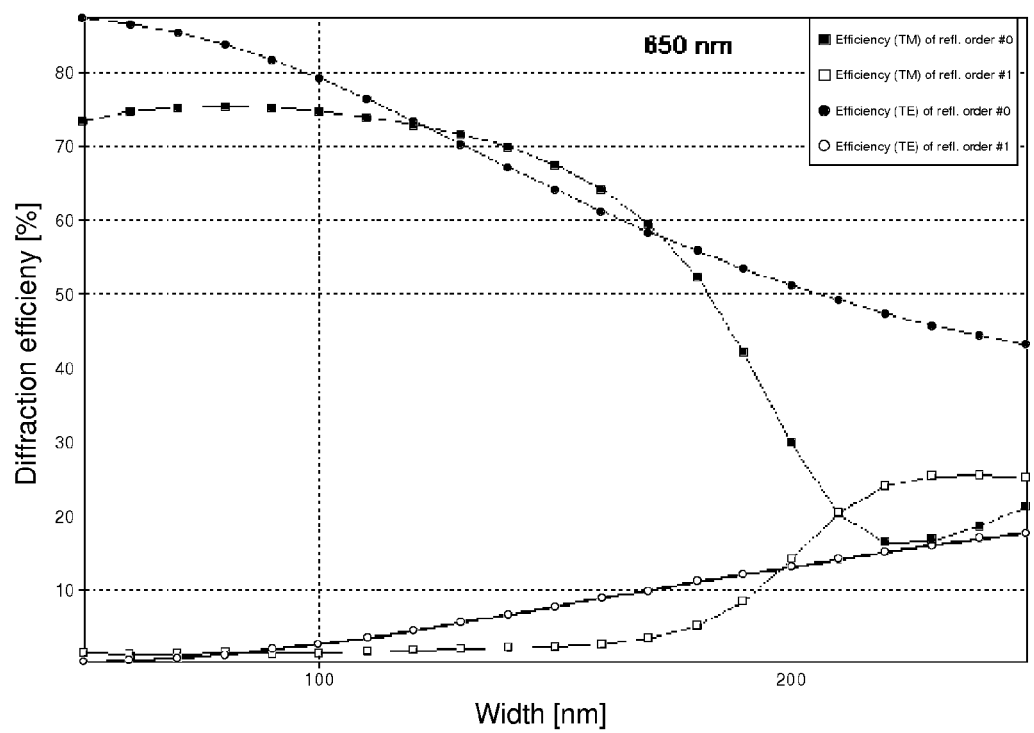
Figure 3:
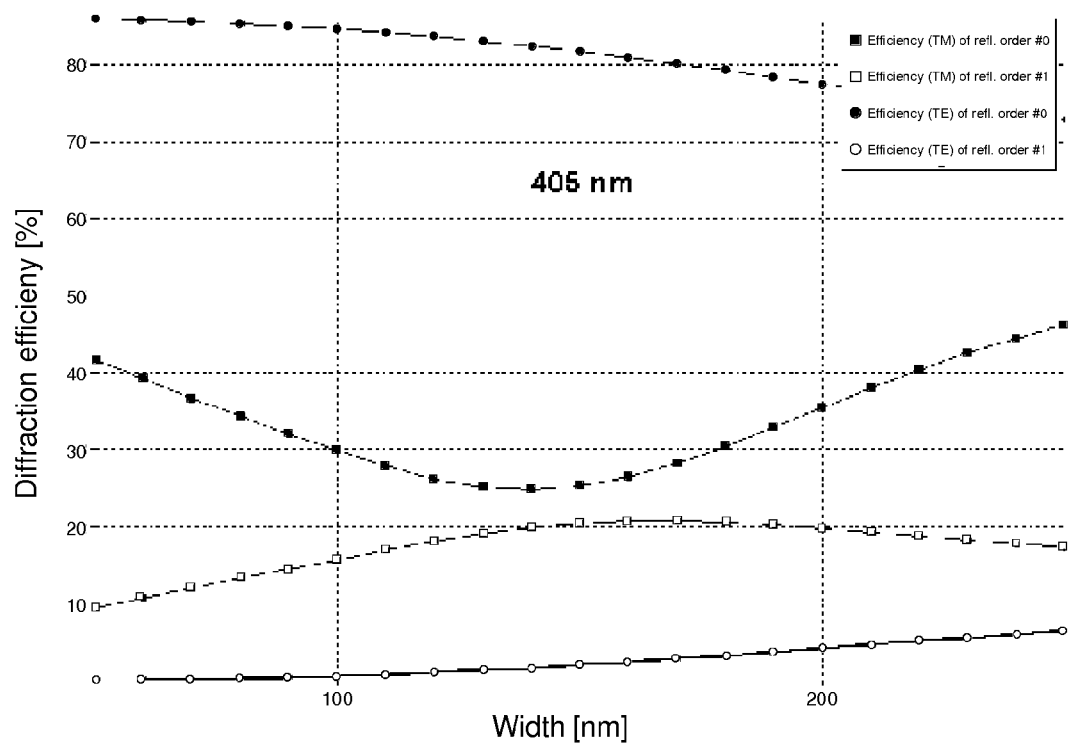

For a better understanding the invention shall now be explained in more detail in the following description with reference to the figures. It is understood that the invention is not limited to this exemplary embodiment and that specified features can also expediently be combined and/or modified without departing from the scope of the present invention. In the figures:

FIG. 1 illustrates the structure of an optical recording medium according to the invention, FIG. 2 shows the result of a simulation of the diffraction efficiency of an optical recording medium according to the invention at a wavelength of 650 nm, and FIG. 3 shows the result of a simulation of the diffraction efficiency of the optical recording medium at a wavelength of 405 nm.

In the following the invention is explained with reference to a DVD-like optical recording medium, which is read with a wavelength around 650 nm. Of course, the general idea of the invention is also applicable to other types of optical recording media.

The structure of an optical recording medium according to the invention is shown schematically in FIG. 1. A polycarbonate cover-layer 1 protects a recording layer 2. The recording layer 2 consists of a dye, an inorganic material or a phase change material that is sensitive for recording at a wavelength around 405 nm, and that allows read-out at a wavelength around 650 nm. An example of such a material is AgSb, as disclosed in Fang et al.: "Optical properties of inorganic AgSb recording thin film", Appl. Phys. Lett. 88, 261917 (2006). The reflectivity of this material varies only slightly from 400 nm to 800 nm. Situated below the recording layer 2 is a reflective aluminum layer 3 with a groove structure 4. Recorded marks 5, which are generated by a laser beam 6 at 405 nm focused by an objective lens 7 are located between the grooves 4. The grooves 4 have a particularly small width for a DVD, e.g. 100 nm, and a small depth, e.g. 40 nm. This ensures that a push-pull signal obtained by an optical pickup is strong at 405 nm and weak at 650 nm.

For recording on the optical recording medium an optical pickup unit operating with a wavelength of 405 nm is used. The optical pickup unit is designed with a numerical aperture of NA=0.374. This means that the laser spot size on the optical recording medium is similar to the laser spot size of a standard DVD recorder with a wavelength of 605 nm and a numerical aperture of NA=0.6, as 0.374=0.6×405 nm/605 nm. Due to the low NA the special optical pickup unit can be manufactured very easily, as a small NA allows for large mechanical tolerances of the optics.

FIG. 2 shows the result of a simulation of the diffraction efficiency of an optical recording medium according to the invention at a wavelength of 650 nm. The simulation is based on the assumption of plane waves at normal incidence, which are either TE or TM polarized. The optical recording medium has a track pitch of 740 nm and a groove depth of 40 nm. The optical recording medium is similar to the one shown in FIG. 1 except that there is no recording layer 2. The push-pull signal strength depends mainly on the strength of the radiation diffracted into the 1st and the −1st diffraction order, assuming that the 0th order is stronger than the 1st order. The simulation shows that for a groove width of 100 nm the diffraction efficiency into the 1st order at 650 nm is below 2% for both TE and TM. This means the push-pull signal is very small.

FIG. 3 shows the result of a simulation of the diffraction efficiency of the optical recording medium at a wavelength of 405 nm. The simulation is based on the same assumptions as the simulation of FIG. 2. As can be seen, contrary to the results at 650 nm the diffraction efficiency into the 1st order at 405 nm is 16% for TM, which means that the push-pull signal is strong. The signal strength of the push-pall signal can be further enhanced by using a polarization filter in front of the detector used for generating the push-pull signal, which blocks the TE part of the light.

The invention claimed is:

1. An optical pickup for recording on an optical recording medium intended to be read with a second wavelength and a second numerical aperture, the optical pickup comprising a light source for generating a light beam at a first wavelength and a numerical aperture given by the second numerical aperture multiplied with the ratio of the first wavelength and the second wavelength.

2. The optical pickup according to claim 1, wherein the difference between the first wavelength and the second wavelength is larger than 50 nm.

3. The optical pickup according to claim 1, wherein the first wavelength is around 405 nm, the second wavelength is around 650 nm, and the numerical aperture is around 0.374.

4. The optical pickup according to claim 1, further having a polarization filter in front of a detector for generating a push-pull signal, which blocks a transverse electric part of the light beam.

5. A recording device for recording on an optical recording medium intended to be read with a second wavelength, the recording device comprising an optical pickup according to claim 1.

* * * * *